No. 758,988. PATENTED MAY 3, 1904.
J. H. LUBBERS.
APPARATUS FOR DRAWING GLASS ARTICLES.
APPLICATION FILED DEC. 4, 1902.
NO MODEL. 3 SHEETS—SHEET 2.

WITNESSES
INVENTOR

No. 758,988. PATENTED MAY 3, 1904.
J. H. LUBBERS.
APPARATUS FOR DRAWING GLASS ARTICLES.
APPLICATION FILED DEC. 4, 1902.
NO MODEL. 3 SHEETS—SHEET 3.

WITNESSES
INVENTOR

No. 758,988. Patented May 3, 1904.

UNITED STATES PATENT OFFICE.

JOHN H. LUBBERS, OF ALLEGHENY, PENNSYLVANIA, ASSIGNOR TO JAMES A. CHAMBERS, TRUSTEE, OF PITTSBURG, PENNSYLVANIA.

APPARATUS FOR DRAWING GLASS ARTICLES.

SPECIFICATION forming part of Letters Patent No. 758,988, dated May 3, 1904.

Application filed December 4, 1902. Serial No. 133,858. (No model.)

*To all whom it may concern:*

Be it known that I, JOHN H. LUBBERS, of Allegheny, in the county of Allegheny and State of Pennsylvania, have invented a new and useful Apparatus for Drawing Glass Articles, of which the following is a full, clear, and exact description, reference being had to the accompanying drawings, forming part of this specification, in which—

Figure 1:
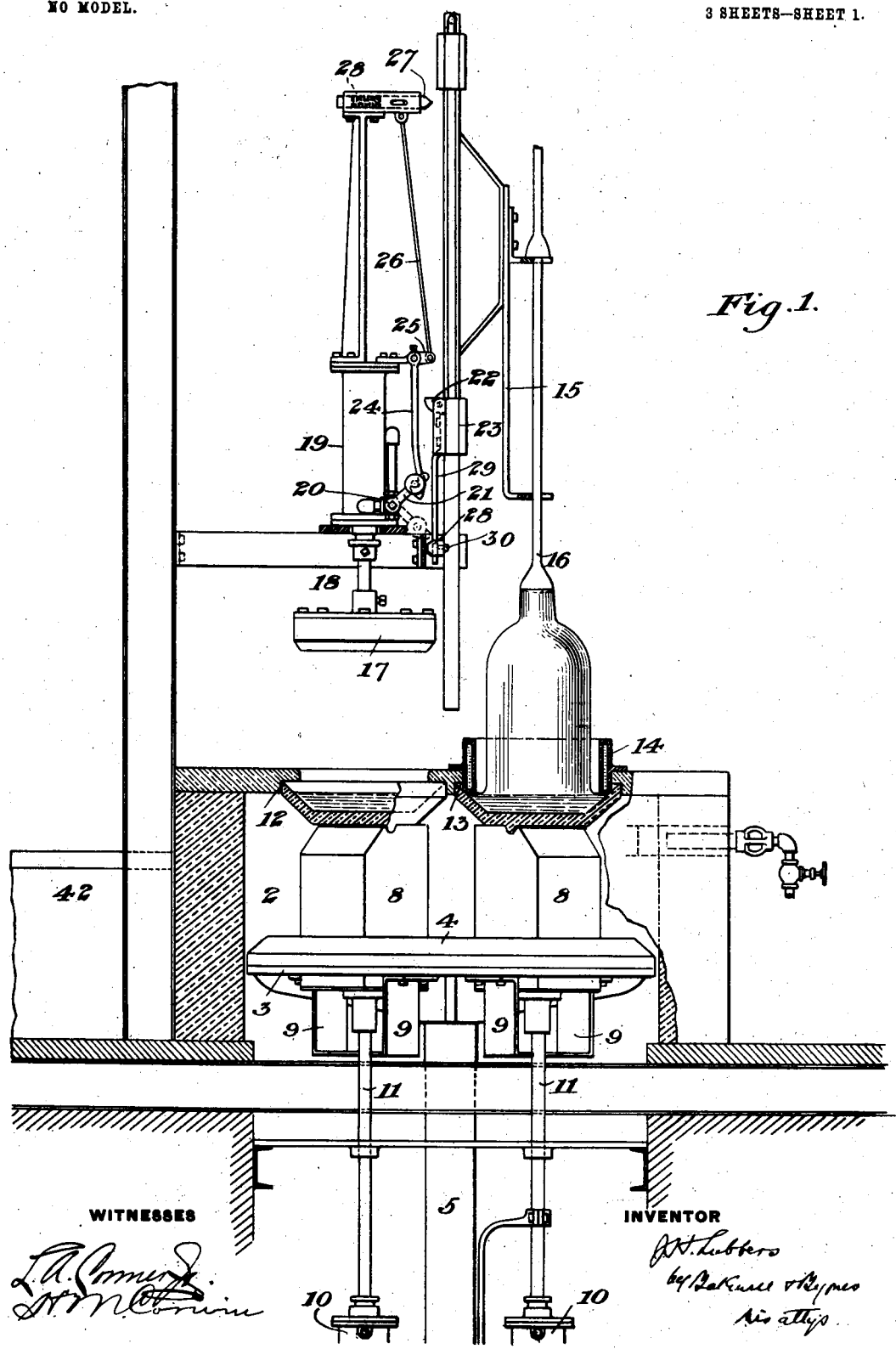
Figure 2:
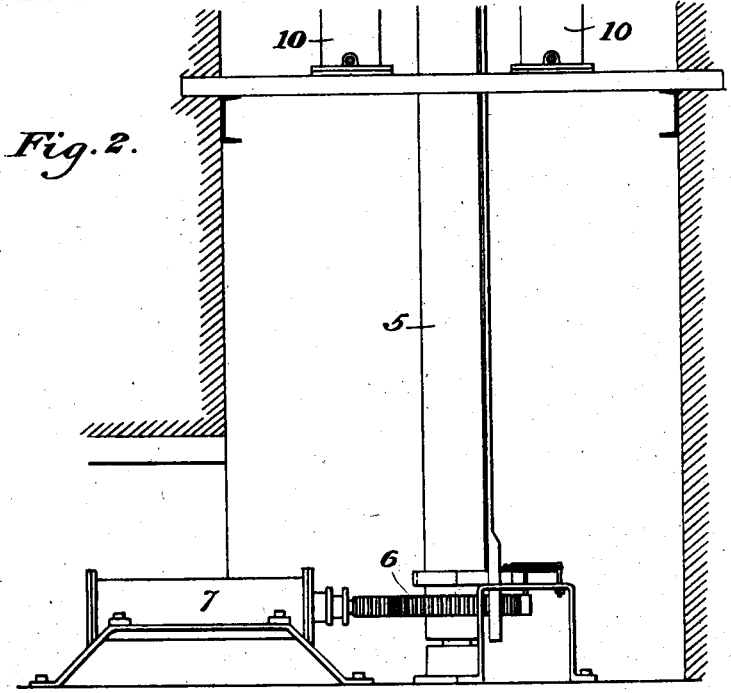
Figure 3:
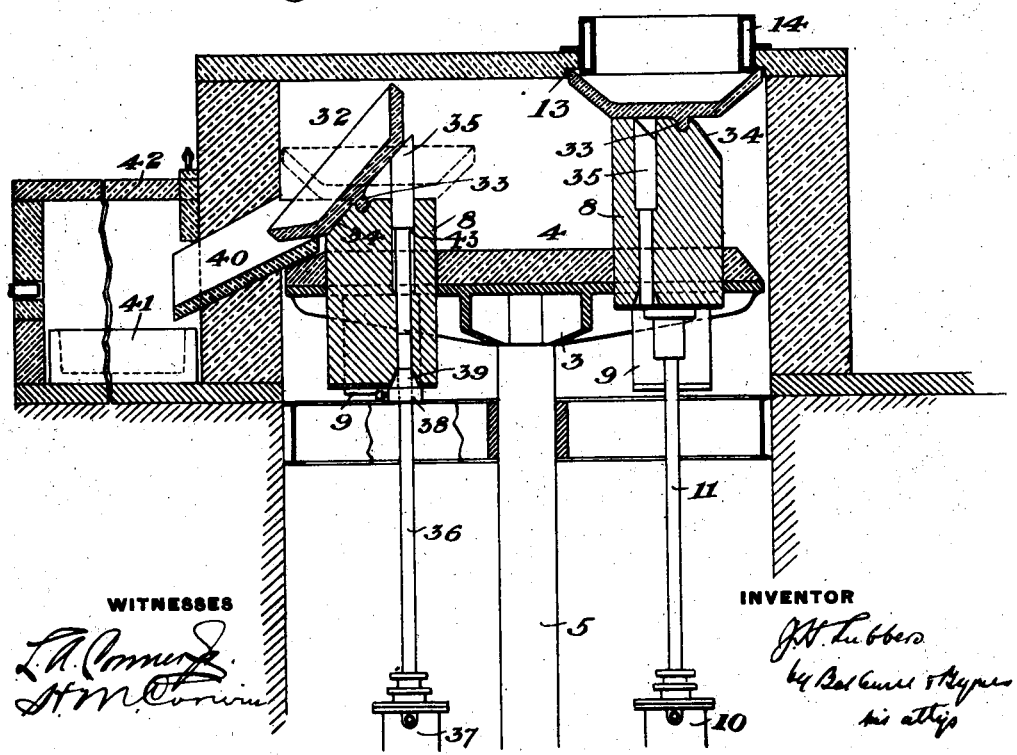
Figure 5:
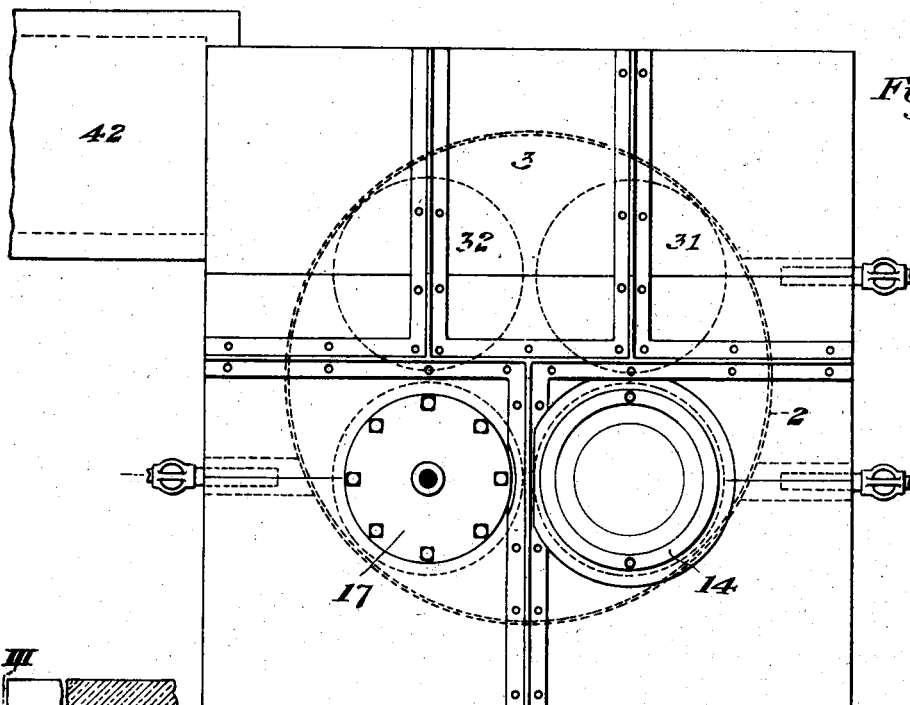
Figure 4:
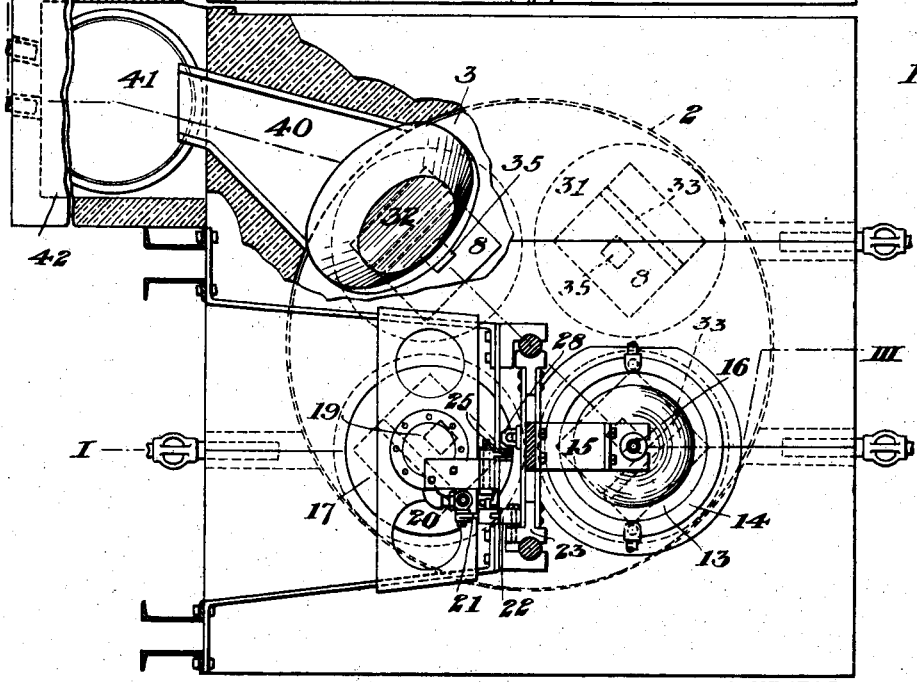

Figure 1 is a sectional side elevation on the line I I of Fig. 4. Fig. 2 is a side elevation showing the mechanism for rotating the carrier. Fig. 3 is a partial vertical section on the line III III of Fig. 4. Fig. 4 is a sectional top plan view partly broken away, and Fig. 5 is a top plan view showing the arrangement of the top stones.

My invention relates to the drawing of glass articles from separate pots in which the glass is ladled or fed and is designed to provide for the heating of the glass remaining in the pot after one drawing operation and then the pouring out of part or all of this melted glass, thus getting rid of the impure and objectionable portions.

It is also designed to automatically regulate the cooling of the glass in the pots before drawing therefrom, so that the glass will be at the proper temperature when brought to the drawing-station without attention of the operator and by mechanism beyond his control.

In the drawings, in which I show a preferred form of my apparatus, 2 represents a heating-chamber, which may be of cylindrical form and which is heated by any suitable arrangement of gas-burners projecting into it. Within the furnace is a rotary carrier consisting, preferably, of a rotary turn-table 3, having refractory covering 4, and mounted on a rotary post 5, which extends downwardly through the bottom of the furnace and is actuated intermittently by suitable mechanism 6, actuated by motive cylinder 7.

On the turn-table are carried blocks or supports 8, of which I have shown four, though a greater number may be used, and within the scope of my broader claims it is possible to use a single pot, though I prefer to employ four, as shown. When in their lower position, the supports 8 rest on brackets 9, and they are adapted to be raised at two positions by means of lifting-cylinders 10 10, mounted beneath the furnace and having plungers 11 11, extending upwardly beneath the turn-table and arranged to elevate the pots to the top of the furnace in registry with openings 12 and 13, which are respectively the charging and the drawing openings. The opening 13 in the top of the furnace is the drawing-opening, where the glass cylinders are drawn from the pots, and this opening is surrounded by a water-cooled ring 14, through which a constant stream of water is maintained. Above this opening is mounted the drawing apparatus, consisting of lifting mechanism 15 and a pipe 16, which may be similar to the ordinary glass-blower's pipe and connected to a source of compressed air. The furnace-opening 12 is a charging-opening, and as the pots are successively brought thereto and raised measured charges of molten glass are poured into them.

In order to provide for regulating the amount of cooling the glass after it is ladled into the pot, I provide a tile cover 17, secured to the lower end of the piston-rod 18 of the motive cylinder 19, mounted on a suitable support over this opening. The supply and exhaust ports of this cylinder may be controlled by hand-valves, so that the operator can raise and lower the cover at will, the length of time that the cover is in raised position determining the amount of cooling of the glass; but I prefer to employ automatic mechanism which will hold the cover elevated for a predetermined interval and then lower it to prevent further cooling. I have shown for this purpose a three-way valve 20, controlling the supply and exhaust of the cylinder 19, the valve having a weighted arm 21, which is adapted to be engaged by a pivoted tappet 22 on the slide 23 of the drawing apparatus. This tappet is prevented from swinging downwardly, but is allowed to swing upwardly as its support moves down into the lowermost position. As the glass is drawn upwardly the tappet engages the weighted arm and swings it up into position where it is caught by a depending hook 24, which forms the lower arm of a pivoted bell-crank, the other arm, 25, of which is connected by link 26 with a spring-pressed plunger 27, carried in a casing 28. The end of the plunger 27 and the arm 25 are in a different vertical plane from the tappet 22 and is adapted to be engaged by an adjustable tappet 28, carried on a depending rod 29 and adjustably held by a set-screw 30. When in the upward movement of the drawing device the tappet 28 engages the plunger 27, this plunger is forced back against the resistance of its spring, and the hook is thus swung out of engagement with the weighted arm, allowing the arm to drop down to exhaust on which the cover is lowered. It is therefore clear that as the drawing apparatus moves up motive fluid is admitted to the cylinder 19, thus lifting the cover over the charging-station. The glass is then ladled or fed into the pot at this position, and the length of time that the cover is held elevated is regulated by adjusting the lower tappet, which determines the amount of cooling of the glass before it is taken to the drawing-station. After the article has been drawn from the pot the next quarter-revolution brings this pot to the reheating-station 31, where the remaining glass in the pot is heated to make it more liquid and ready for pouring out. At the fourth station 32 the pot is tilted to discharge a part or all of the glass remaining in it. For this purpose I have shown the pot as having a downwardly-projecting boss or rounded lug 33, which engages a recess in a carrying-block, the one side of this block being beveled or cut away at 34 to allow the pot to tilt into the position shown in Fig. 2. In order to thus tilt the pot, I show the blocks as having a vertical hole within which rests the vertically-movable pusher 35, which may be of refractory material and is preferably provided with a beveled upper face. The pusher and hole are square or of other angular cross-section to hold the pusher in the proper position, and the lower end of the pusher is arranged to be engaged by the upper end of the piston-rod 36 of motive cylinder 37, which is under control of the operator. This piston-rod is provided with an adjustable collar 38, which preferably has a tapering upper portion 39, arranged to fit in a corresponding tapering recess in the bottom of the block. When the pot is brought to this discharging-station, the piston-rod 36 is forced up, thus tilting the pot into the position shown in Fig. 3, when the contents or a part of them will be discharged into a refractory trough 40, leading downwardly and outwardly through the side walls of the furnace and discharging into a pot 41 within a side heating-chamber 42, having suitable heating-burners. After the glass is thus discharged from the pot the piston-rod is lowered, the pot drops back into its horizontal position on the block, and the pusher-rod moves down within the block to a level where it is held by its shoulder 43, resting on an inner shoulder on the block.

The operation is as follows: The pots having been set on the blocks in the heating-chamber and heated, the cover is raised by an operator, the pot below the charging-opening is raised, and a measured quantity of glass is poured into it from the ladle and the cover is then lowered. The pot remains in its elevated position during the drawing of the glass from the next pot, and during this drawing the cover over the charged pot is automatically lifted and held up a predetermined interval, giving the desired amount of cooling, and is then lowered. In the drawing operation the pipe is lowered into the glass and then gradually raised, air being at the same time admitted through the pipe to form the neck, and then the amount of air is increased to expand the cylinder to the amount desired as the drawing proceeds. After the cylinder is completed its lower end is severed from the glass in the pot by lowering the pot and allowing the flame to strike the lower part of the cylinder. The drawn article is then removed and the table rotated a quarter-revolution, thus taking the filled pot to the drawing-station and carrying the pot from which the article has been drawn to the reheating-station, where the glass is brought to a more molten condition. At the same time a pot is carried from the melting-station to the discharging-station, at which station the pot is tipped to eject the glass, or a part of it, this being done during drawing at the other station.

As the pots travel through the chamber the heat therein maintains the pots and the glass therein at the proper temperature to give the desired results.

The advantages of my invention result from the automatic controlling of the cooling of the glass in the charged pot, and, further, from the discharging of a part or all of the glass remaining in the pot after its drawing before the pot is recharged. Owing to the different amounts of light on different days the operator is unable to judge accurately with the eye as to the proper temperature of the glass by its color, and hence by automatically holding the cover elevated for a predetermined interval I am enabled to cool each charge to the same degree, thus giving uniform results. If a change in the amount of cooling is found desirable, the tappet may be set at a different point to change the time interval. By ejecting from the pot a part or all of the remaining glass I get rid of the impure portion of this remaining glass, which is found in practice to injure the quality of the cylinders. I can also use a large body of glass from which to draw, and then pour off the impure top portion. This gives an advantage, as the glass can be drawn of greater thickness from a larger bath.

The mechanism by which I accomplish the predetermined cooling and also the ejecting of the glass from the pots may be widely varied by the skilled mechanic, as may the other parts of the apparatus, without departing from my invention.

I claim—

1. Apparatus for drawing glass, comprising in combination with a drawing device a plurality of drawing-pots, a heating-chamber, mechanism for successively bringing the pots and drawing device into alinement, and mechanism for regulating the cooling of the glass charged into the pots; substantially as described.

2. Apparatus for drawing glass articles, comprising in combination with a drawing device, a plurality of drawing-pots, a heating-chamber, means for successively bringing the pots and drawing devices into alinement, and means for ejecting at least a portion of the glass from the pots after drawing; substantially as described.

3. Apparatus for drawing glass articles, comprising in combination with a drawing device, a plurality of drawing-pots, a heating-chamber, means for successively bringing the pots and drawing device into alinement, and means for tilting the pots to eject at least a part of the glass therein; substantially as described.

4. Apparatus for drawing hollow glass articles, comprising in combination a drawing device, a heating-chamber a plurality of pots, a carrier upon which the pots are pivotally mounted, a tilter, a mechanism for actuating said tilter to tilt the pots at one station; substantially as described.

5. Apparatus for drawing glass articles, comprising in combination with a drawing device, a heating-chamber having a top drawing-opening and top feed-opening, a plurality of drawing-pots, mechanism for successively bringing the pots into alinement with the feed-opening, and the drawing-opening, a cover for the feed-opening, and mechanism for raising and lowering said covers; substantially as described.

6. Apparatus for drawing glass articles, comprising in combination with a drawing device, a heating-chamber having a top drawing-opening and a feed-opening, a plurality of drawing-pots, mechanism for successively bringing the pots into alinement with the feed-opening and the drawing-opening, a cover for the feed-opening, mechanism for raising the cover and mechanism for automatically lowering the cover after a predetermined interval; substantially as described.

7. Apparatus for drawing glass articles, comprising in combination with a drawing device, a heating-chamber, a carrier, having at least four pots, and mechanism for successively ejecting at least a part of the glass from the pots after drawing; substantially as described.

8. Apparatus for drawing glass articles, comprising a heating-chamber, a rotary carrier therein having a charging-station, a drawing-station, a reheating-station, and a glass-ejecting station, and at least four pots mounted on the carrier; substantially as described.

9. Apparatus for drawing glass comprising a drawing apparatus, a series of pots, mechanism for bringing the pots and drawing apparatus successively into alinement, and means for ejecting at least a portion of the remaining glass from the pots after drawing; substantially as described.

10. Apparatus for drawing glass comprising a drawing device, a series of pots, mechanism for bringing said pots and drawing apparatus successively into alinement and mechanism for tilting the pots to eject glass therefrom after the drawing operation; substantially as described.

In testimony whereof I have hereunto set my hand.

JOHN H. LUBBERS.

Witnesses:
    GEO. B. BLEMING,
    M. M. GRIFFIN.